Oct. 9, 1934.　　　　E. O. NORMAN　　　　1,976,626
　　　　　　　　　　MOLDING PROCESS
　　　　　　　Filed Nov. 11, 1930　　　5 Sheets-Sheet 1

Inventor
E. O. Norman.
By Semmes & Semmes
Attorneys

Oct. 9, 1934.  E. O. NORMAN  1,976,626
MOLDING PROCESS
Filed Nov. 11, 1930  5 Sheets-Sheet 2

Oct. 9, 1934.   E. O. NORMAN   1,976,626
MOLDING PROCESS
Filed Nov. 11, 1930   5 Sheets-Sheet 3

Fig. 4.

Inventor
E. O. Norman.
By Semmes & Semmes
Attorneys

Oct. 9, 1934.  E. O. NORMAN  1,976,626
MOLDING PROCESS
Filed Nov. 11, 1930   5 Sheets-Sheet 5

Inventor
E. O. Norman.
By Semmes & Semmes
Attorneys

UNITED STATES PATENT OFFICE 1,976,626

MOLDING PROCESS

Ephraim O. Norman, Talladega, Ala., assignor to Alabama Pipe Company, a corporation of Alabama Application November 11, 1930, Serial No. 494,935

4 Claims. (Cl. 22—198)

The invention relates to castings, and more particularly has reference to a method and apparatus for forming a casting mold.

In the casting of many articles, such for example as pipe, it has heretofore been the practice to form the "drag", "cope" and "core" of the mold in three different ramming operations, and finally assemble these parts in a still further operation. The disadvantages of such a method are obvious, inasmuch as it is quite common to find some parts of the mold rammed harder than is advisable, while other parts are rammed too soft. Hence, it results that inequalities of metal thickness, impairing the usefulnes of the castings, are obtained. Other disadvantages accruing from processes of this nature, reside in the fact that they are inherently complicated, and of necessity require a maximum amount of labor with a consequent expensive product.

Up to the present, the art has failed to devise a process as well as molding machinery, wherein the mold for irregular annular objects, such for example, as a smooth bore ribbed pipe with bell and spigot ends having locking devices associated therewith, can be formed in one complete operation. That is, the inner and outer surfaces of the mold, pouring gates, and runners have heretofore been formed in different steps. Not only has this been true in the casting of pipe, but also in casting other types of articles as well, where similar difficulties have been encountered so that it has been impossible to form the mold in a single step.

The major object of this invention is the provision of a process and apparatus for forming a mold for a casting, which lack the inherent disadvantages of processes and apparatuses heretofore employed.

An equally important object of the invention is the provision of a process and apparatus for performing the same, wherein the sand core and outer walls of a mold for a casting may be rammed in one operation.

Another object of the invention is the devising of a method and apparatus for the molding of castings, the designs of which permit the use of match plates or match boards in vertical position for molding.

Still a further object of the invention is the provision of a simplified process and apparatus for forming a casting mold which is effective in producing a casting of great smoothness and uniformity with a minimum of labor and expense.

With these and other objects in view, which may be incident to my improvements, the invention consists in the method steps and the parts and combinations of the apparatus for performing the same, to be hereinafter set forth and claimed with the understanding that the steps of the process as well as the several necessary elements comprising the apparatus of my invention may be varied in performance as well as construction, proportions and arrangement, without departing from the spirit and scope of the appended claims.

The invention comprehends the provision of a process as well as an apparatus, for forming the mold of a casting. One way of practically carrying out the process forming the subject matter of the invention, is the provision of a machine having a central ramming base with which is associated a set of draw plates slidably mounted upon slideways. Means are provided for actuating the draw plates and other means for raising and lowering and revolving the ramming base about which is centered a core arbor, segmental pattern, and flask for forming the mold.

The method of forming the mold for the casting briefly comprises the steps of centering the core arbor upon the ramming base, and the portions of the segmental pattern and flask upon the draw plates when in withdrawn position, moving the draw plates together so as to close the mold, and locking the flask forming members together. Upon the completion of this step, the base is raised and rotated while sand is slung, thrown, blown or poured within the interior of the mold forming member so as to form the mold, after which the rotating mechanism is arrested, the mold lowered, and the pattern and flask are separated into their parts by withdrawing the draw plates. With the pattern and flask forming members so positioned, the former, which are hinged to the latter, may be removed and the interior of the mold cavity may be faced if necessary. The parts of the flask are then moved into closed position around the core arbor, and the entire mold, including flask and core arbor, is removed from the machine for pouring.

In order to make my invention more clearly understood, I have shown in the accompanying drawings, means for carrying the same into practical effect without limiting the improvements in their useful applications to the particular constructions which, for the purpose of explanation, have been made the subject of illustration.

Figure 1:
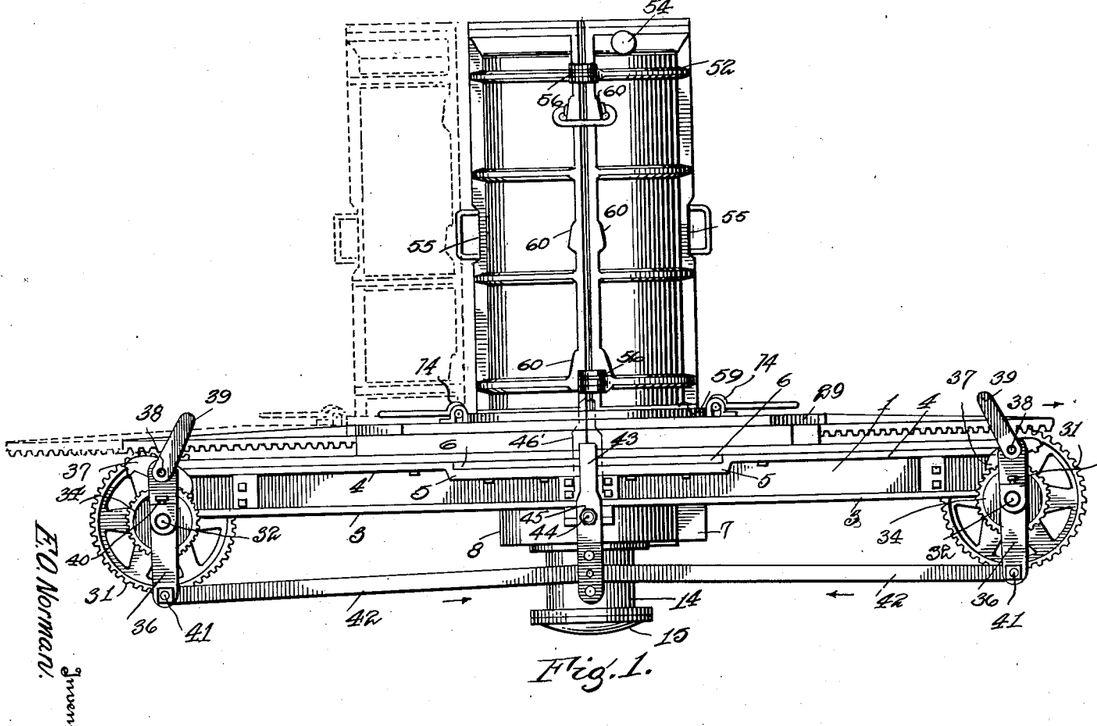
Figure 1 is a side elevation of the molding machine forming the subject matter of the invention.
Figure 5:
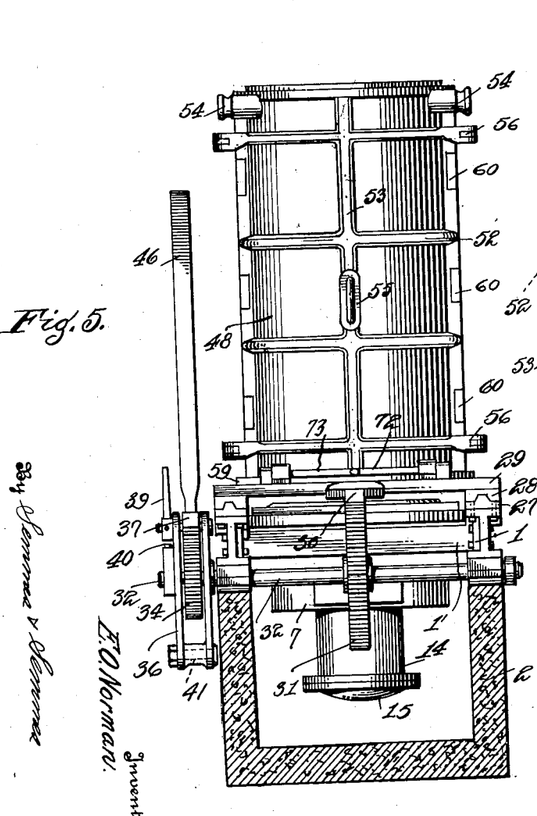
Figure 5 is an end view of the machine forming the subject matter of the invention.

Throughout the drawings, similar reference numerals refer to like parts in the different views. There is shown in Figure 1, a mold forming machine, the raising and rotating mechanism of which, as well as the means for moving the mold forming members from side to side of the machine, are carried upon I-beams 1 mounted upon each side of a suitable base or bed. Such a bed, as shown in Figure 5, is generally designated by the reference numeral 2, the I-beams 1 being secured thereto by means of suitable anchor bolts which extend through the lower flange of the I-beams and into the bed 2. Suitable tie rods 1' extend between the I-beams, and are connected to the webs thereof so as to form a strong supporting frame for the machine. Each I-beam 1 extends beyond the ends of the bed 2, for a purpose to be hereinafter pointed out.

The I-beams are of the usual standard construction having a lower flange 3 and an upper flange 4. It may be noted, however, that the upper flange near the longitudinal center of each I-beam, is bent downwardly as indicated by the reference numeral 5, so as to provide a seat for a tie plate 6, which extends between the I-beams on each side of the base and is secured to the upper flanges thereof by any suitable means.

This tie-plate, as will appear, is for the purpose of supporting the mechanism adapted to raise and lower, and to rotate the mold forming members of the machine. In order to accomplish this purpose, a gear casing or housing comprised of two halves 7 and 8, has its outer and upper flanges 9 secured to the tie plate 6, in any conventional manner, which for the purpose of simplifying the drawings, has not been shown. Within the gear box there is provided a web 10, to which are secured the flanges of a split machine assembly collar 11, for supporting a worm wheel 12. Positioned above the collar 11 and worm 12 is a suitable bearing 13, the flange of which is secured to the top flange of the gear casing in any conventional manner.

Upon the lower side of the gear casing or housing, there is secured a cylinder 14 having a cylinder head 15, the cylinder being provided with a piston 16. The cylinder head is provided with the usual packing plate 17 and cup leather 17'. Suitable means are provided in the cylinder for allowing the inlet and exhaust of fluid so that the piston may be actuated. This may be accomplished by any fluid pressure means, air being satisfactory for the purpose. The fluid under pressure may be admitted to and discharged from the cylinder by the use of a three-way valve so as to allow the piston to remain in desired positions for any period of time.

It may be noted that the piston 16 is provided through its center with a circular channel or bore closed at its lower end for the reception of the lower end of a main shaft 18. This shaft is inserted through an opening provided in the tie plate 6, the main bearing 13 and the worm gear 12. Its lower end is supported in the piston and rests on a suitable thrust bearing 19 comprising upper and lower thrust washers separated by ball bearings, as is clearly shown in Figure 4.

For allowing vertical movement of the main shaft 18, relative to the worm 12, the former is provided with a suitable keyway adapted to engage a gib key placed in a keyway on the hub of the worm. It will thus be appreciated that upon suitable actuation of the piston 16, the main shaft 18 may be raised, while at the same time it maintains its connection with the worm 12 so that when the latter is rotated, the main shaft will also be revolved.

Figure 4:
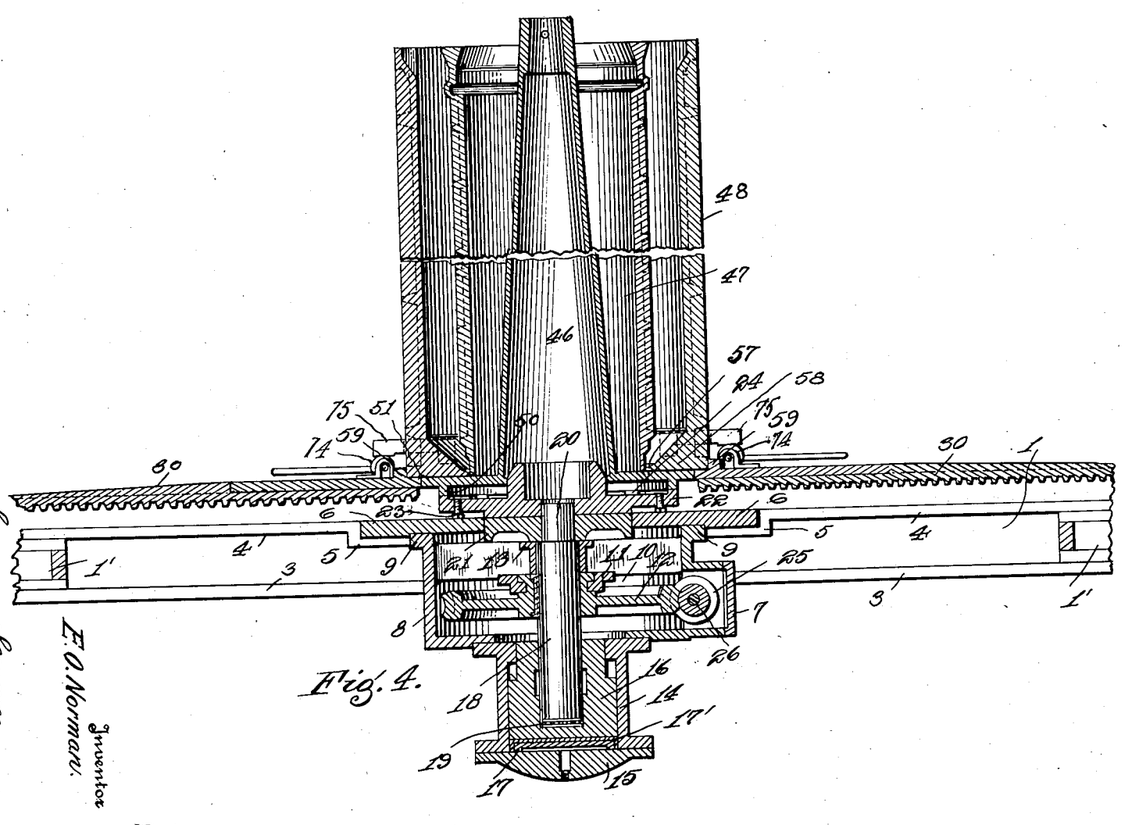
Figure 4 is a vertical sectional view taken along the line 4—4 of Figure 2.

As may be noted in Figure 4, the central portion of the tie plate is provided with a circular opening through which the upper end of the main shaft 18, which is provided with a reduced portion 20, passes. Upon this portion of the shaft there is shrunk a collar or ramming base 21, the upper surface of which is flush with the plate 6 and to which is secured a core arbor centering plate 22. If desired, the core arbor centering plate may be secured to the ramming base 21 by means of cap screws which are inserted through the top of the core arbor centering plate so as to permit the same to be removed without difficulty.

As will be later pointed out, the core arbor centering plate is of different sizes for different castings, and it is hence essential that it be detachably connected to the ramming base 21. Also for a purpose which will presently appear, the core arbor centering plate is provided with cap screws 23 which engage the under surface thereof, and when the piston is in its position adjacent the cylinder head, as shown in Figure 4, have their heads in contact with the tie plate 6. In addition to this, the upper surface of the core arbor centering plate is provided with a plurality of pads 24.

In order to rotate the worm 12, and consequently the main shaft 18, which carries the collar 21 and core arbor centering plate 22, a worm 25 adapted to mesh therewith is mounted upon a suitable shaft 26 which extends into the gear casing with its axis perpendicular to the axis of the main shaft. Shaft 26 may be supported upon bearings in any suitable manner. The driven shaft 26, upon which the worm 25 is mounted, may be rotated by any desired means through a suitable power source.

I have had considerable success, however, by using a low horse power electric motor which drives a sprocket connected by a silent chain to a second sprocket, the latter being mounted on the constant speed shaft of a variable speed transmission. The constant speed shaft is in turn belted or otherwise connected to a variable speed shaft which is secured to the shaft 26 by a flexible coupling. While this means of rotating the main shaft carrying the core centering arbor has been described, it is to be understood that other means may be substituted therefor without departing from the spirit of the invention or the scope of the appended claims.

Figures 2, 3:
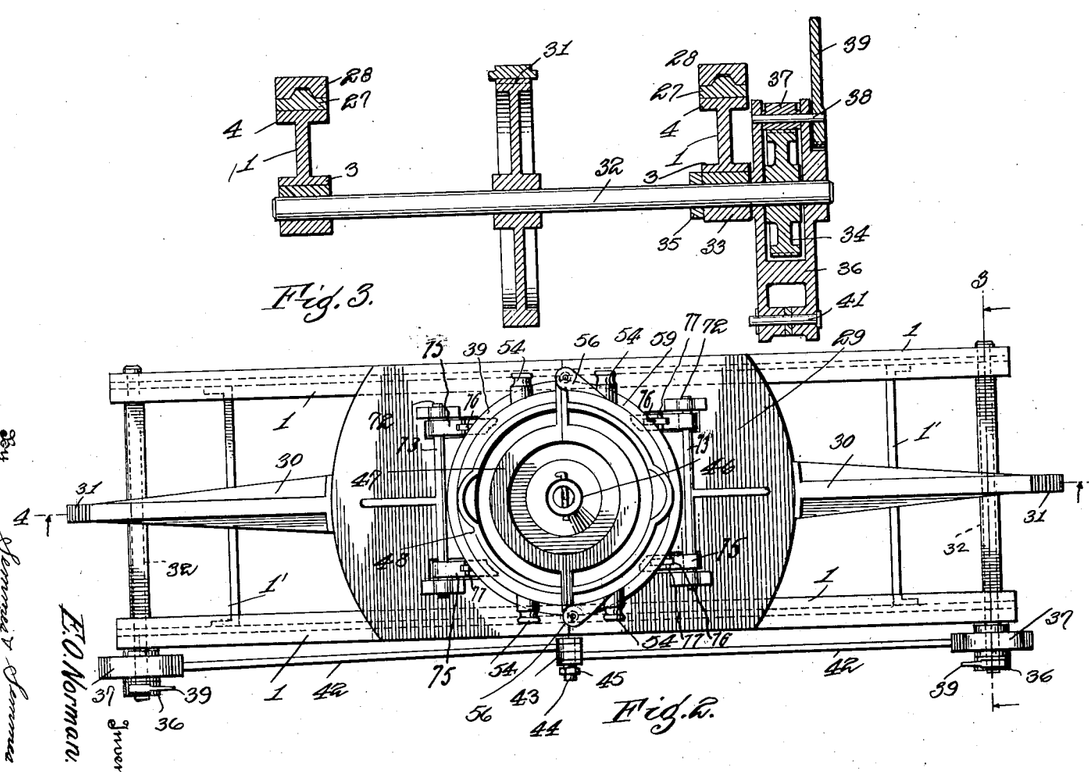
Figure 2 is a plan view of the machine shown in Figure 1.
Figure 3 is a vertical sectional view along the line 3—3 of Figure 2, and discloses the means for moving the mold carrying parts of the machine.

Turning now to the mechanism employed for carrying the mold parts to and from the core arbor centering plate or ramming base, it may be noted from an inspection of Figures 2 and 5, that upon the top flanges of each I-beam 1 there is mounted a lower slide plate 27, upon which is movably mounted the upper slide plate 28.

The slide plates 27 are secured to the upper flanges of the I-beams and extend for the full length thereof, while two plates 28 adapted to slide upon plates 27 are employed on each of the sides of the machine. As may be noted, upon the right and left of the center of the machine there is provided one of a pair of draw plates 29 to the bottoms of which are connected the upper slide plates 28. The upper side of a rack 30 is also secured to the under side of a draw plate. These racks 30 are actuated by means of the pinions 31 mounted upon shafts 32 supported from the undersides of the I-beams 1 at each end of the machine.

From an inspection of Figures 1, 2 and 5, it may be noted that each draw plate 29 is of a width equal to that of the I-beam base of the machine, the adjacent edges of each draw plate being adapted to contact with each other when moved towards the center of the machine by the actuation of the pinions 31 and racks 30. For the sake of simplifying the drawings, the means of connecting the draw plates to the sliding plates 28 and to the racks 30, have been omitted. It is obvious, however, that any means desired may be employed, such means including bolting, welding, or any other type of connection.

By allowing the I-beams to project beyond their foundation base, bearings 33 for supporting the shafts 32 may be mounted in any suitable manner, on the underside of the I-beam ends. The mechanism for actuating each of the shafts 32 so as to rotate the pinions 31 and consequently actuate the racks 30, comprises a ratchet wheel 34 keyed to each of the shafts 32. Each shaft 32 is provided with a collar 35 adjacent the shaft bearing nearest to which the ratchet wheel 34 is mounted. By means of such a collar, play of the shaft is prevented. As already indicated, two ratchet mechanisms are employed, each of which comprises a main ratchet lever 36, between the upper ends of which is mounted a pawl 37 upon a ratchet arm pin 38. Upon the other side of the pin 38 there is secured a pawl position lever 39. Each pawl is provided with a suitable plunger 40.

As may be observed in Figures 2 and 3, the lower end of each ratchet lever 36 has secured thereto, by means of a pin 41, one end of a connecting rod 42, the other end of which is secured to a power handle 43 mounted upon a shaft 44. The shaft 44 is positioned at the longitudinal center of the machine, and is mounted in bearings, one of the bearings being fastened under the center of the I-beam 1 for the inner end of the shaft, while the other bearing is in the retaining wall of the foundation. Shaft 44 is clamped tight in its bearings, while the power handle 43 is allowed to rotate. In order to maintain the power handle 43 in its proper place, a collar 45 is positioned on the shaft 44. A suitable power handle extension 46' is provided so that the mechanism may be readily operated.

From this description, it will be apparent that upon positioning the pawls, as shown in Figure 1, and swinging the operating lever 43 in a clockwise direction, the draw plates 29 will be forced apart after which upon changing of the position of the pawls and swinging the power handle 43 in the opposite direction, that is counterclockwise, the draw plates will be moved inwardly towards the center of the machine to the position shown in Figure 1.

The parts or members employed to form the mold for the casting comprise the cor arbor 46, segmental pattern 47 and the segmental flask 48, both of the latter being formed in two halves. It may be noted the core arbor 46 is adapted to be rammed up inside the pattern and forms the core of the mold, as its name implies. Near its upper end it is provided with oppositely disposed openings 49 for the reception of a shackle pin, this pin being employed for handling the entire mold after ramming. The core arbor is adapted to be fitted upon the core arbor centering plate, as clearly shown in Figure 4, the flanges 50 formed upon its base 51 being in contact with the raised pads 24 upon the upper surface of the core arbor centering plate.

Turning to the segmental flask 48, it may be noted that its outer surface is ribbed, being formed of transverse ribs 52 and the longitudinally extending ribs 53. Near its upper end, the flask is provided with trunnions 54, employed in setting the flask upon the pipe machine. Also wrought iron hooks 55 are formed upon the back of the halves of the flask to permit handling, as in shaking out or stocking. Each half of the flask is provided on one side with two hinge bearings 56, which it will hereinafter appear, are adapted to have the halves of the pattern swung therefrom. The flask halves are interchangeable and their faces are finished along the surfaces which they fit together.

Figure 6:
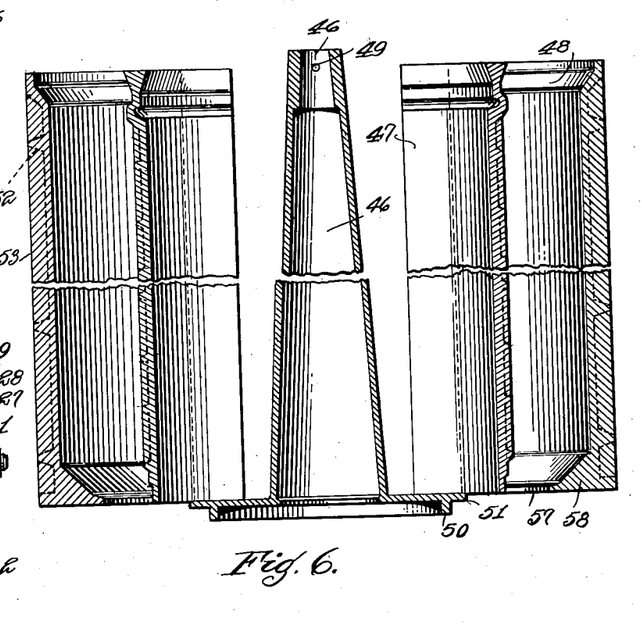
Figure 6 is a vertical sectional view showing the parts of the mold forming members in separated position.

As may be noted particularly well in Figures 4 and 6, the flange on the bottom of each flask half extends inwardly to form a shelf 57 so that only an opening of a definite size is left in the center when the flask halves are face to face. Of course, the size of this opening will be dependent upon the size of the annular casting for which the flask is designed. Also to be noted is the fact that the wall of the flask is brought down in a gradual taper on the inside edge of the bottom, as indicated by the reference numeral 58. The bottom of the flange or shelf 57, as well as the vertical face on the outside of the flange at the bottom of the flask are machined.

By finishing the shelf 57, it will be appreciated that direct alignment with the draw plate and the base plate of the core arbor on which the flask rests at various times during operation, is obtained, while the finishing of the exterior face of the flask allows a close fit with the rings 59 formed upon each draw plate so that when the draw plates are in contact with each other the rings 59 form a complete circle. Thus it will be appreciated that when the flask halves are set upon the draw plates and are moved towards each other, the rings just mentioned, will locate the flask halves in their proper place and in alignment with each other. Also to be noted is the fact that each flask half is provided with a plurality of pads or projections 60, which may be engaged by C clamps when the flask halves are fitted together so that they may be maintained in such position.

Figure 7:
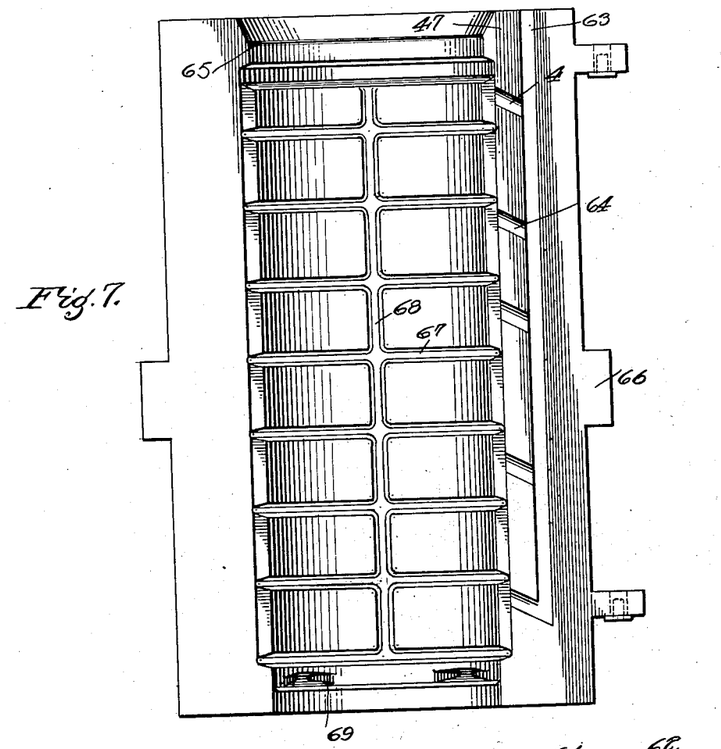
Figure 7 is a plan view of a pattern used in the formation of a mold for a bell and spigot type of pipe, the pipe body being provided with a plurality of strengthening ribs.
Figures 8, 9:
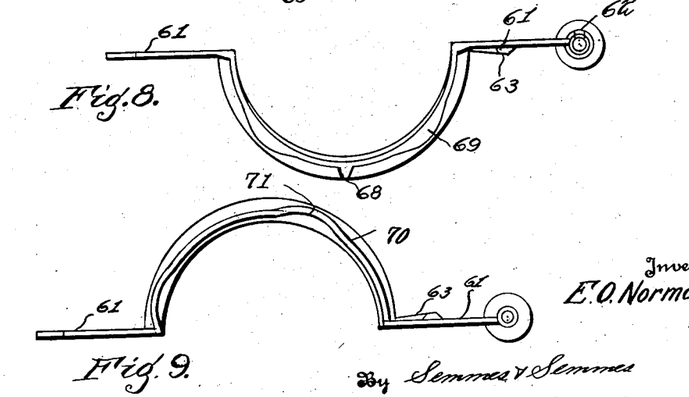
Figure 8 is a bottom plan view of the pattern shown in Figure 7.
Figure 9 is a top plan view of the pattern shown in Figure 7.

In Figures 7 through 9 inclusive, I have shown in detail a pattern used for the formation of bell and spigot ended pipe, the base being provided with a plurality of ribs upon its outer surface. It is to be understood, however, that while such a pattern is disclosed, patterns of different designs as well as different shapes may be employed with my invention as well as the process to which it relates.

The pattern halves 47 are provided with match plates 61 upon which are formed hinges 62 to permit swinging of the pattern halves on the flask halves. As is the case of the flask halves, the pattern halves are also interchangeable. With the type of pattern and flask disclosed, it will be obvious that it is unnecessary to form a cope and a drag, while the mold may be formed in one ramming operation, after the parts thereof are positioned as shown in Figure 4. The mold cavity formed between the sand core and flask, after removal of the pattern halves and the securing of the flask halves together, will have a true circular cross section in a horizontal plane due to the construction of the pattern halves themselves.

For the sake of illustration, assume that the match plates on the pattern are ½" thick. Thus it will be apparent that when the halves of the pattern are brought with the faces of their match plates together, there is a 1" distance between the active parts of the pattern which form the outside of the mold. This means that all outside radii are struck from a point ½" off center, so that when the pattern is removed and the mold halves are moved ½" closer together on each side, the outside diameters are true circles. In other words, the radius for the inside of the mold or the core is struck from a point in the same plane as the face of the match plate, and forms a true circular core, while the outside radius is struck from a point in the same plane as the back of the match plate or ½" off from the absolute center of the mold.

This means that when the pattern is removed and the mold is brought up ½" closer together on each side, the ½" space formerly occupied by the match plates will be filled with the molded sand adjacent the interior of the flask, the exterior of which will be of circular shape corresponding to the exterior surface of the pattern. It is to be understood that the match plates may have a thickness other than that specified above, which has been used merely for the purpose of illustration.

The match plates surround the mold both at the bottom and at the top, and also bear forms for runners which conduct the molten iron in the pouring. Thus it may be noted that each match plate is provided with a runner 63 communicating with side gates 64 at various points along the length of the pattern so that when the mold is poured, molten metal will be introduced at different elevations along the pattern. As may be observed, a tapered iron ring 65 is provided on the top of the pattern for the purpose of protecting the top thereof from abrasive action of sand from the slinger, thrower, blower, or pouring device. The ring 65 also forms a pouring basin or runner on the top of the mold. However, if desired, a separate pouring gate runner may be used instead of this construction. Projections 66 are provided on each side of the match plates so as to allow the pattern to be rapped or vibrated before stripping it from the mold.

As pointed out, the pattern disclosed is one which allows the casting of a bell or spigot ended pipe, provided with a locking device on the ends thereof and with a plurality of exteriorly arranged ribs. Thus it may be noted that the pattern is provided with transverse ribs 67 and longitudinal rib 68 formed upon its body. Also for the formation of the spigot end of the pipe, lugs 69 are disclosed.

The bell end of the pattern, as may be observed in Figure 9, is provided with a flange 70 having cutaway portions 71 formed therein so that the lugs on the finished pipe may be inserted therein. The cutaway portions 71 gradually taper on each of their ends into U-shaped channels in which the lugs of the finished pipe are received and held upon being rotated therein.

Adjacent U-shaped channels, at the ends most distant from adjacent cutaway portions are joined to a thick solid section. These solid sections provide a seat and stop for the lugs on the spigot end of a finished pipe section which is coupled to the bell end of another finished pipe casting.

Having described the apparatus in detail, as well as the various members forming the mold, the operation thereof and the process of forming the mold will be apparent. By suitable actuation of the power handle 43, the draw plates 29 are drawn back to the position indicated by the dotted lines in Figure 1.

After this the core arbor 46 is placed on the core arbor centering plate 22, while the halves of the flask 48 are set in their seats in the halves of the draw plates, that is, the lower exterior surface of each flask half is so positioned that it contacts with the ring 59 formed on each draw plate. The halves of the pattern are then hung on the hinges of the halves of the flask. The draw plates bearing the flask halves with the pattern halves hinged thereon are brought together so that the faces of the match plates on the pattern halves are in contact with each other and are clamped evenly together between the faces of the halves of the flask. This may be noted particularly well in Figure 2, showing a top view of the machine. Also, as may be observed in Figure 4, a portion of the lower surface of the flask and the entire lower surface of the pattern are supported upon the base plate of the core arbor.

As previously pointed out, each flask half is provided with a plurality of clamp pads on each side thereof, and at this step of the operation, the flask halves are clamped together by C clamps on the center pads 60. Air is now admitted to the cylinder 14 so as to raise the mold to ramming position, after which the shaft 26 is rotated by the actuation of the power source so as to revolve the mold. Due to the fact that certain speeds have been found best for certain types of mold, it will be appreciated that a variable speed transmission, such as that previously mentioned for connecting the power source to the revolving mechanism, is of great advantage.

While the mold is revolving, the slinger, thrower, blower or pourer head of a suitable sand machine is brought into position so that the mold cavity between the flask and the pattern may be rammed. Ramming of the outer portion of the mold having been completed, the head of the sand machine is moved over to the portion of the mold between the core arbor and the pattern, and this is rammed in a similar manner. It will of course be apparent to anyone skilled in the art that, in lieu of the successive ramming of the outer and inner portions of the mold, or vice versa, the outer and inner portions of the mold may be rammed simultaneously. The ramming having been completed, the top of the mold is struck or leveled off and the mechanism for rotating the same is arrested, whereupon the mold is lowered to its original position on the draw plates by the actuation of the piston 16 in the cylinder.

The reason for tapering the inside edge of the flask at its bottom will now be apparent. Such an expedient causes sand which is slung, thrown, blown or poured in the mold to be packed forcefully against the bottom of the pattern. Likewise the inwardly extending flange or shelf 57 at the bottom of the flask acts as a support for the sand above it in the mold. As already pointed out, by machining the bottom of the flange direct alignment with the draw plate is assured, as is also the case with the base plate of the core arbor.

In preparing the mold for pouring, the same having been filled with suitable sand by the ramming operation just described, the C clamps are removed from the center pads on the flask half, and the flask halves are clamped to the draw plates 29 by means of the clamping mechanism 72 carried upon each draw plate. This mechanism locks the flask halves to the draw plates and the C clamp having been removed, it allows the flask halves to be withdrawn to the ends of the machine upon movement of the draw plates.

Such locking mechanism comprises a shaft 73 rotatably mounted upon each draw plate by means of suitable bearing supports, as is clearly shown in Figures 1, 2 and 4. Each shaft 73 is provided with a suitable actuating handle and near each of the bearing supports with a cam 74 adapted to engage a slotted locking bar 75 with a flask half. The locking bars 75 fit over upright studs 76 secured to the draw plate, each stud being provided with a suitable opening adapted to receive a wedge 77. It will be appreciated that upon suitable operation of either of the actuating handles of the clamping mechanism, the end of the locking bar over the cam roller will be lifted, and by reason of the wedge in the stud 76, the locking bar will be engaged with the flask.

When the halves of the pattern and flask are in separated position, the core arbor with the sand packed therearound is left in the center of the machine, while the pattern and flask halves are separated therefrom. For the purpose of completing the mold, the pattern halves are vibrated or rapped in any conventional manner, and are then swung from the flask halves after which they are lifted off of their hinges and set aside.

In this position, with the pattern halves removed from the flask halves, it will be appreciated that there will be a layer of sand adjacent the interior portion of each flask, also that the surface of the sand most distant from the flask is in position for facing. It is to be observed that in this process the entire area of the cavity that contacts with the molten metal may be treated with a facing material and that by the use of the flask, pattern, and core arbor, such as that disclosed, it is unnecessary to form the core with so-called sharp or core sand, ordinary molding sand being used throughout the mold. Also it will be appreciated that in the formation of a mold of this sort, as has been previously mentioned, the cope and drag are done away with, and moreover, the mold may be completed in one ramming operation.

After facing the parts of the mold, as described, the flasks are again moved towards the center of the machine where they contact with each other, after which they are clamped together by C clamps on all of the sets of pads formed upon the flask. The clamping mechanism 72 is then released so that the flask is made free from the draw plates, after which a shackle and suitable pin are placed in position at the top of the core arbor within the openings 49 and the entire mold is moved to the pouring position.

In the formation of a mold in this manner, it will be appreciated that the conduits for introducing the molten metal between the mold and cavities are formed directly in the mold itself and that moreover such introduction is made at a plurality of points along the mold cavity. By inclining the gates, splashing of iron onto the molten cavity along its length is prevented, and moreover, a cooling of the molten metal from the bottom upwardly, is attained.

Bearing in mind the points just mentioned in connection with the mold that is formed, it will be appreciated that with the completion of the operations previously described, the molten metal may be poured into the mold through the gates, and the casting completed. This metal is passed downwardly through the pouring runners and rising passes through the gates into the mold, the mold being poured in a vertical position. Gases escape through vent holes (not shown) provided in the halves of the flask and in the core arbor. After completion of the pouring, and upon the cooling of the mold, the core arbor is forced therefrom by means of a suitable extension clamp, the C clamps in the flask are removed and the halves taken apart. The pipe is then free from the mold and is ready to be taken to the cleaning room.

While the invention has been described for the formation of castings whereby a bell and spigot ended pipe may be provided, it is obvious that other types of castings may be made with different molds by following the process outlined. For example, the invention also comprehends designs which permit the use of match plates or match boards in vertical position of molding, and includes molds for smooth bore ribbed pipe, plain round pipe with bell and spigot ends, valve boxes and covers, flanged pipe and pipe fittings, radiator and boiler sections, sign bases, lamp standard bases, machinery castings, manhole covers, and for many other forms of castings. It is obvious that the invention is not limited to the formation of castings having an annular shape, as articles having different contours may be formed by the use of the machine and process forming the subject matter of the invention.

As just pointed out, the invention is not limited to the formation of the mold for any particular type of casting. It will likewise be understood that the sizes of such molds, that is their longitudinal and transverse dimensions as well as their thickness, may also be varied as desired. Previously mentioned was the fact that the size of the core arbor centering plate will vary for different sizes of molds. The same, of course, will be true in connection with the size of the core arbor itself, the pattern halves and the flask halves.

For the purpose of preventing the working pit from filling up with sand and also to make work around the machine free from hazard, steel plates may be mounted upon the top of the upper slide plates 28 so as to move with them. The purpose of the cap screws 23 positioned in the under surface of the core arbor centering plate, as well as the pads 24 mounted upon the upper surface thereof, will now be appreciated. The heads of the cap screws 23, when the piston 16 is positioned as shown in Figure 4, are in contact with the tie plate 6, with the result that perfect alignment of the mold is attained, which would be impossible if the core arbor centering plate rested on the plane surface of the tie plate, due to the fact that sand or other foreign matter would prevent the plates coming evenly together. It is for this same purpose that the top of the core arbor centering plate is provided with the raised pads 24 upon which rest the flange 50 formed upon the base 51 of the core arbor.

From the foregoing description it will be appreciated that I have devised a novel process and apparatus for forming a casting mold. Not only does the invention do away with the usual cope and drag for casting molds, but it allows the use of ordinary molding sand throughout the formation of the same. In addition to this, it will be appreciated that by the performing of the process upon the machine which I have disclosed, a mold complete with pouring runners and gates may be formed, such a mold being rammed in one operation. Due to the simplicity of the process, as well as the apparatus, it will be appreciated that there is provided a casting mold which is effective in producing a casting of great smoothness and uniformity which is made with a minimum of labor and expense.

While I have shown and described the preferred embodiment of my invention, I wish it to be understood that I do not confine myself to the precise steps or details of construction herein set forth, by way of illustration, as it is apparent that many changes and variations may be made therein, by those skilled in the art, without departing from the spirit of the invention, or exceeding the scope of the appended claims.

I claim:

1. A method of forming a casting mold comprising assembling a segmental pattern and a segmental flask, vertically ramming the mold internally and externally of the pattern, horizontally moving the flask segments from the core, horizontally moving the pattern segments from the core in the same general direction as the flask segments are moved, and reassembling the exterior portion of the mold and the flask segments about the core.

2. A method of forming a casting mold comprising assembling a segmental flask, and a pattern made up of segments corresponding generally to the segments of the flask, ramming the mold internally and externally of the pattern while the assembled elements are in a vertical position, horizontally moving from the interior portion of the mold each segment of the flask together with its corresponding pattern segment, then removing the pattern segments from the exterior portion of the mold and the flask segments, and reassembling the exterior portion and flask about the interior portion of the mold.

3. A method of forming a casting mold comprising assembling a segmental flask, and a pattern made up of segments corresponding generally to the segments of the flask, ramming the mold internally and externally of the pattern while the assembled elements are in a vertical position, horizontally moving from the interior portion of the mold each segment of the flask together with its corresponding pattern segment, then pivotally removing the pattern segments from the exterior portion of the mold, and reassembling the exterior portion and flask about the interior portion of the mold.

4. A method of forming a casting mold comprising vertically assembling a segmental pattern and a segmental flask, ramming the mold internally and externally of the pattern while the assembled elements are in a vertical position, horizontally and simultaneously removing the pattern segments and the flask segments from the interior portion of the mold in substantially a single operation, removing the pattern segments from the exterior portion of the mold and the flask segments and reassembling the exterior portion and flask about the interior portion of the mold.

EPHRAIM O. NORMAN.